United States Patent [19]

Perichaud et al.

[11] Patent Number: 4,664,991

[45] Date of Patent: May 12, 1987

[54] COMPOSITION BASED ON A ELECTRON CONDUCTING POLYMER AND ITS APPLICATION TO A POSITIVE ACTIVE MATERIAL FOR ELECTROCHEMICAL GENERATORS

[76] Inventors: Alain Perichaud, "La Respelido", 62 rue des Polytres, 13013 Marseille; Alain Le Méhauté, 3 route de Belleville, 91190 Gif sur Yvette, both of France

[21] Appl. No.: 775,159

[22] Filed: Sep. 12, 1985

[30] Foreign Application Priority Data

Sep. 21, 1984 [FR] France .................... 84 14534

[51] Int. Cl.$^4$ ...................... H01M 4/02; H01M 11/40
[52] U.S. Cl. ...................................... 429/194; 429/213; 252/500
[58] Field of Search ................ 429/213, 194; 252/500

[56] References Cited

U.S. PATENT DOCUMENTS

| | | | |
|---|---|---|---|
| 4,375,427 | 3/1983 | Miller et al. | 429/213 |
| 4,442,187 | 4/1984 | MacDiarmid et al. | 429/213 |
| 4,472,489 | 9/1984 | Maxfield et al. | 429/213 |
| 4,556,617 | 12/1985 | Kruger | 429/213 |

OTHER PUBLICATIONS

Boscato et al, Synthesis of Polyphenylene Polysulfur, Chem. Abst. 95-204479j, Polym. Bull., (Berlin) 1981, vol. 4, No. 7, pp. 357-359.

*Primary Examiner*—Donald L. Walton

[57] ABSTRACT

In a substance based on an electron conducting polymer, for use in a positive active material for electrochemical generators, for example, the polymer is of a one-dimensional character. The substance further comprises at least one polysulfurated chain forming a complex with the polymer.

10 Claims, 4 Drawing Figures

COMPOSITION BASED ON A ELECTRON CONDUCTING POLYMER AND ITS APPLICATION TO A POSITIVE ACTIVE MATERIAL FOR ELECTROCHEMICAL GENERATORS

BACKGROUND OF THE INVENTION

1. Field of the Invention

The present invention is the result of the work of Mr. Alain LE MEHAUTE employed by LABORATOIRES DE MARCOUSSIS, the research center of COMPAGNIE GENERALE D'ELECTRICITE, and of Mr. Alain PERICHAUD employed by UNIVERSITE AIX-MARSEILLE I.

The present invention concerns a composition based on an electron conducting polymer and its application to a positive active material for electrochemical generators.

2. Description of the Prior Art

There exist polymers featuring along their chain numerous double conjugate bonds and therefore liable to feature significant electron conductivity, which is not the general rule with polymers. This conductivity may be modulated by doping, by reducing or oxidizing the polymer and neutralizing the excess charges by means of a counter-ion which may be either an anion or a cation.

The electron conducting polymers include polyanilines, polyacetylene, polyparaphenylene, paraphenylene polysulfide, paraphenylene polyvinyl, polythiophene, polypyrrole, and substituted derivatives of these substances.

The specific energy of the active materials that can be produced from these polymers is on average less than 500 Wh/kg at three volts. There is known, for example, a secondary electrochemical generator of which the negative electrode is of lithium, the positive electrode of a doped polyacetylene the monomer of which has the formula $C_2H_2 (LiClO_4)_{0.3}$, and the electrolyte is lithium perchlorate in propylene carbonate. The voltage of a cell of this kind is 3.7 volts and the theoretical specific capacity and energy of the positive active mass are 139 Ah/kg, that is 516 Wh/kg and 206 Wh/liter, but after implementation as a generator the stored specific energy does not exceed 100 Wh/kg.

It is found in practice that active materials based on electron conducting polymers do not in the current state of the art offer any significant improvement over existing mineral materials; thus in primary generators these materials offer less performance than substances of the $MnO_2$ or carbon fluoride type and in secondary generators it is found that the best results are obtained with mineral materials such as $NiPS_3$, $TiS_2$, $MoS_3$ which all in practice exceed 200 Wh/kg.

An objective of the present invention is to provide a substance based on an electron conducting polymer offering performance characteristics very much higher than those of known materials and providing for the obtaining of positive active materials having a theoretical specific energy which may be in excess of 1 000 Wh/kg.

SUMMARY OF THE INVENTION

The present invention consists of a substance containing a one-dimensional electron conducting polymer and at least one polysulfurated chain forming a complex with said polymer.

It is to be understood that, although the basic polymer has a one-dimensional structure, the complex formed does not necessarily have this one-dimensional character.

The fact that said chain forms a complex with the polymer signifies that the sulfur has at least partially oxidized or reduced the polymer in the complex formed, the conductivity of the polymer chain being preserved at least in part.

In a first embodiment, at least one atom of sulfur in said polysulfurated chain is grafted onto said polymer, the remainder of said chain being charge transfer related to said polymer.

In another embodiment all of said polysulfurated chain is charge transfer related to said polymer, there being no covalent bonds with the polymer. For the required specific capacity to be obtained, said composition comprises at least 0.7 atom of sulfur per carbon atom of the monomer of said polymer.

Said polymer may be selected from the group comprising polyacetylenes, polyparaphenylenes, polythiophenes, polypyrroles, polyanilines and their substituted derivatives.

Other characteristics and advantages of the invention will emerge from the following description given by way of non-limiting example with reference to the accompanying drawings.

DESCRIPTION OF THE PREFERRED EMBODIMENT

Consider a substance based on polyacetylene oxidized by the polysulfurated chain in accordance with the invention.

It should be noted that until now attempts have always been made to avoid any oxidation of the polyacetylene by oxygen as this produces difficulties with subsequent doping, a loss of electron conductivity and thus a reduction in the expected electrochemical performance.

The present invention goes against this accepted principle in proposing inter alia various methods of oxidizing polyacetylene to produce a substance yielding a positive active material of high electrochemical activity, oxidation in this case being achieved by the sulfur.

EXAMPLE 1

In a particularly simple process polyacetylene and sulfur are heated together in a ratio by mass of 1 to 1.5; the heating temperature is always below 444° C.

A mixture is prepared containing 14.8 grams of sulfur and 10 grams of $(CH)_x$ obtained from dehydrochloridized polyvinyl chloride. The mixture is slowly heated to 160° C. for 16 hours under a flow of argon and then rapidly quenched in ice. There is obtained a black powdery mass which crumbles on contact to yield a very fine divided powder (sample A).

Microcalorimetric analysis is carried out to show the structure of the product.

The test is conducted in the following manner. 50 mg of sample A is weighed into a calibrated aluminum capsule; the capsule is crimped up and placed in the calorimetry tube of a Perkin Elmer DSC2. The thermal power input c (vertical axis - microcalories per second) is plotted as a function of temperature T (horizontal axis - degrees Kelvin). The rate of temperature increase is set at 20° C. per minute.

There is obtained the curve III which is compared with the curve I for sulfur alone and the curve II for polyacetylene alone. Curve III proves that the polysulfurated chain is associated with the polyacetylene; there appears a spike corresponding to a sulfur-containing complex.

EXAMPLE 2

Figure 1:
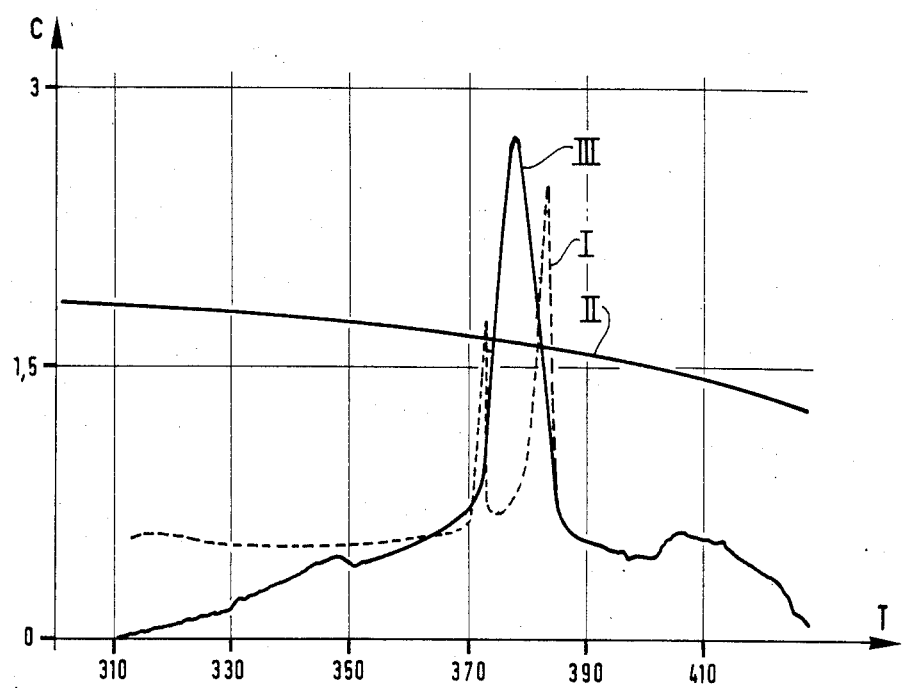
FIG. 1 is a microcalorimetric analysis diagram for sample A of a substance in accordance with the invention.

100 mg of sulfur are dissolved in 7 cm$^3$ of liquid ammonia. This solution is brought into contact with 50 mg of polyacetylene so that all the powder is wetted by the solution. A reaction occurs between the two compounds, the color of the sulfur solution changing progressively from blue to yellow. The liquid ammonia is slowly evaporated at a temperature of $-20°$ C. at atmospheric pressure. There forms a polysulfide of ammonium and carbocation as revealed by the elementary analysis. In this case the length of the polysulfurated chain is limited to $(S_6)_{--}$ but this chain can be lengthened by direct reaction with sulfur at 160° C. There is obtained a sample B which is submitted to DSC analysis as described above. There is obtained a curve analogous to the curve III in FIG. 1 showing the sulfur-containing complex.

EXAMPLE 3

Firstly polyvinyl chloride is dehydrochloridized in liquid ammonia. For this purpose a mixture of PVC and sodium amide in stoichiometric proportions is placed in a cell.

The cell is hermetically sealed and the liquid ammonia in the cell condensed at $-40°$ C. at atmospheric pressure. The temperature in the closed cell is then increased to ambient temperature and the cell is maintained at a pressure of 8 kg/cm$^2$ for 10 hours. The ammonia is then evacuated in gaseous form and the product recovered is a black powder consisting of polyacetylene and sodium chloride. After washing with de-ionized and oxygen-free water to eliminate the sodium chloride, sample C is obtained.

Sample C is heated to 160° C. for 16 hours in the presence of excess sulfur. The product obtained (sample D) is a metallic black colored product which when subject to nuclear magnetic resonance analysis at 300 MHz shows a relaxation band at 55 ppm indicating the existence of at least a few carbon-sulfur bonds.

EXAMPLE 4

The process is the same as in example 3, except that the sulfur is placed directly in the cell with the PVC and the sodium amide. The sulfur is then grafted on directly at the dehydrochloridation stage. Sample E is obtained.

EXAMPLE 5

All the previous samples were obtained from polyacetylene $(CH)_x$ obtained from dehydrochloridized polyvinyl chloride. It is possible to use the other conductive polymers mentioned hereinabove.

Thus the operations of example 1 may be carried out with polythiophene substituted for polyacetylene. 7 grams of polythiophene and 16 grams of sulfur are placed in a sealed tube. The tube is heated to 200° C. for 24 hours. The product obtained is sample F.

The energy storage properties of samples A to F above in an electrochemical generator are now considered.

Each sample is mixed with acetylene black in proportions of 50% by weight. A suspension of SOREFLON is added. The suspension is destablized using a very small quantity of ethanol. There then forms a mixture of PTFE, black and active substance which may be mechanically worked. The resulting electrode contains approximately 32 mg of active material per cm$^2$ of surface area. It is assembled into button type electrochemical generators with a surface area of 1.5 cm$^2$. The negative electrode is a lithium electrode, and the "Celgard" type separator is impregnated with a solution of LiClO$_4$ in dioxolan.

The generators are discharged at 50 μA after storage for one week at 30° C.

Figure 2:
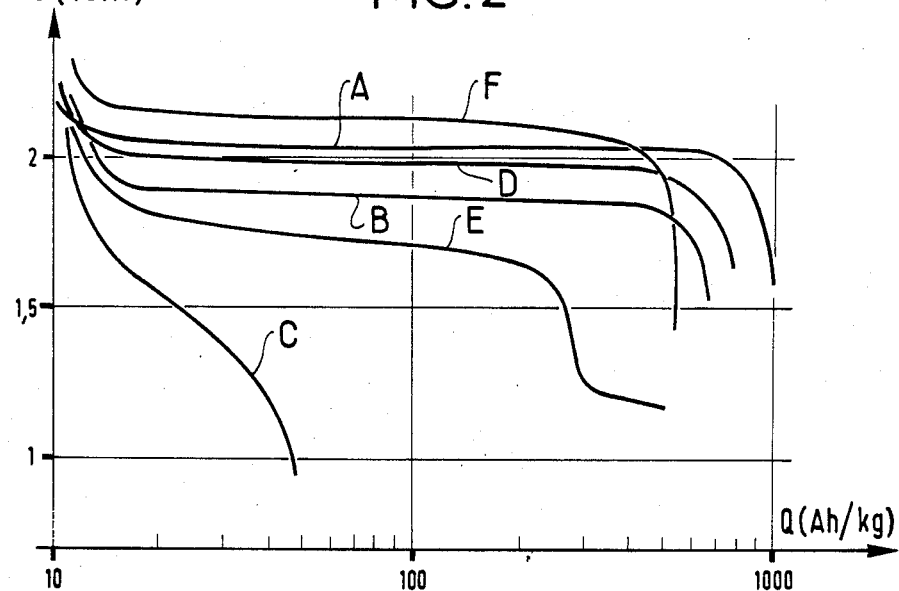
FIG. 2 shows the energy storage properties of various active materials in accordance with the invention.

The accompanying FIG. 2 shows the variations in the voltage U (volts) as a function of the specific capacity Q (Ah/kg) for the various samples made. The following remarks apply to curves A through F.

Using the direct reaction process (sample A) the capacity achieved per cell is of the order of 45 mAh at an average voltage of 2.06 volts, that is an average stored energy of around 93 mWh. As a result, the specific energy available is approximately 1 850 Wh/kg.

The fact that the reaction takes place with excess sulfur is of the greatest importance since the same sample of $(CH)_x$ reacted with a quantity of sulfur such that one atom of sulfur is associated with each monomer unit has a specific capacity of only some 550 Ah/kg.

The synthesis medium can evidently be modified. Thus it is possible to synthesize the $(CH)_x$ in ammonia (sample C) and then to synthesize the complex $(CH)_x$/sulfur (sample D).

It also possible to carry out the synthesis in one stage, the sulfur then being in competition for dehydrochloridation with the strong base (sodium amide). As shown by example E, this results in a highly effective product as compared with sample C which relates to the product not reacted with sulfur.

Finally, it is possible to replace a conductive polymer such as $(CH)_x$ with any other conductive polymer such as polythiophene (sample F).

Figure 3:
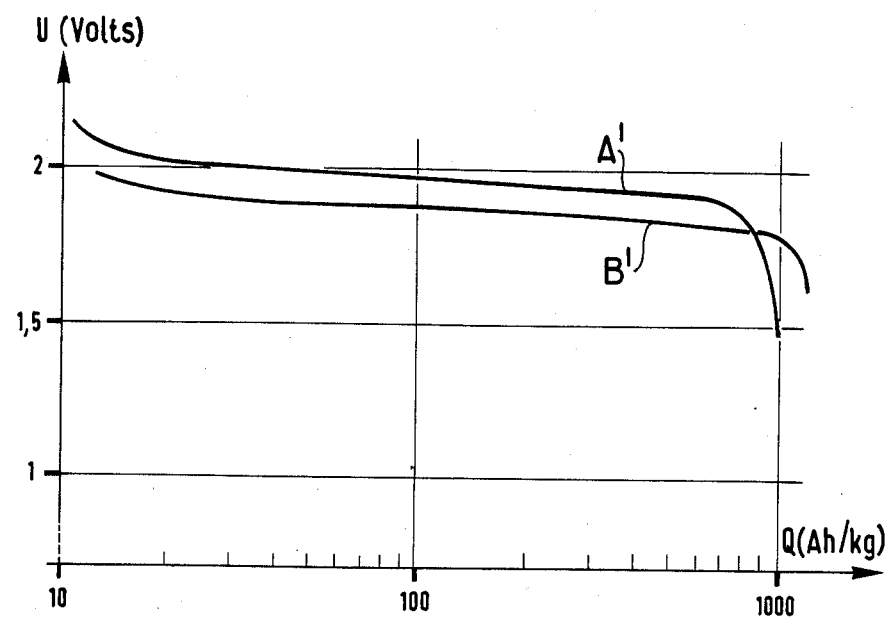
FIG. 3 is a variation on FIG. 2.

In one embodiment the active material is mixed in proportions of 50% by weight with acetylene black; it is then coprecipitated with a solution of polyoxyethylene and LiCF$_3$SO$_3$ and then evaporated dry until a solid film is obtained. The solid film contains approximately 20 mg of active material per cm$^2$ of electrode. This electrode is then disposed facing a lithium electrode, as previously. The discharge is carried out as indicated above. The results achieved with samples A and B are shown in FIG. 3 in the form of the curves A' and B'.

In examples 1 to 4 above it was considered, to a first approximation, that the method of synthesizing the polyacetylene $(CH)_x$ was not of significant importance. However, it is possible to show that this is not the case, in particular when the polyacetylene is synthesized by dehydrochloridation of PVC. It is possible to dehydrochloridize PVC to varying degrees: 20%, 50%, 95% and 100% by adjusting the quantity of the base (potassium tributoxide, sodium amide, etc.) relative to the PVC. The product obtained is placed in reactional contact with the sulfur (molar ratio 1.5) and the electrochemical tests are carried out using the same electrochemical procedure as for samples A through F.

Figure 4:
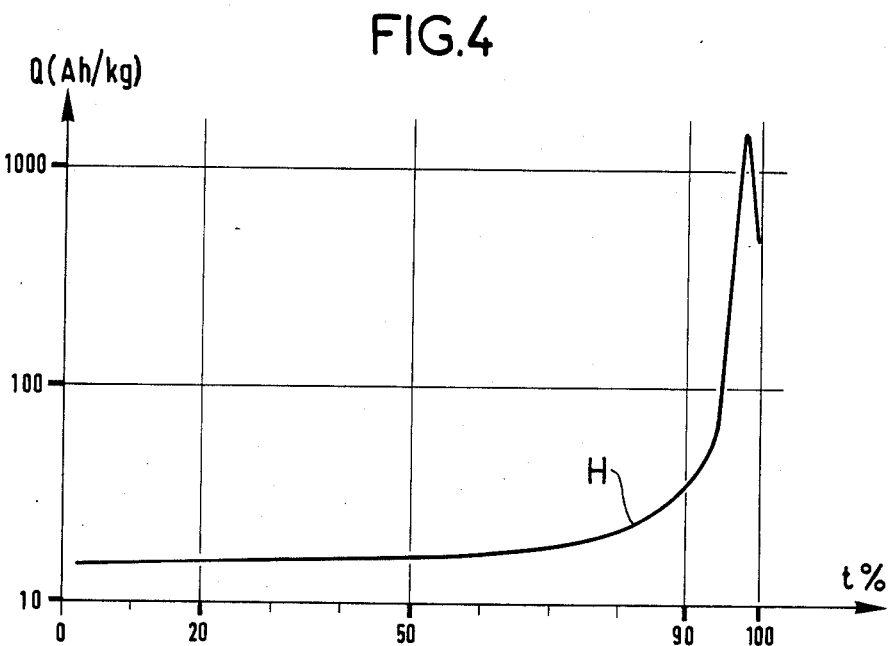
FIG. 4 shows the influence of the nature of the polyacetylene obtained by the dehydrochloridation of polyvinyl chloride on the specific capacity of an active material in accordance with the invention.

FIG. 4 includes a curve H showing the variations in the specific capacity Q (Ah/kg) of a sample of active material in acordance with the invention according to the degree (t%) to which the original PVC is dehydrochloridized.

It is to be understood that the invention is not limited to the embodiments described hereinabove, especially with regard to the choice of basic conductive polymers. Also, applications of the substances in accordance with the invention are not limited to electrotechmical applications. They may also be used in the electrotechnical field, for example in the manufacture of overhead electrical connecting cables, and any form of electical connecting cable in contact with the air or any oxidizing atmosphere.

There is claimed:

1. A composition comprising a one-dimensional electron conducting polymer and at least one polysulfurated chain forming a complex with said polymer, wherein at least a part of said polysulfurated chain is in simple charge transfer relation to said polymer.

2. A composition according to claim 1, wherein at least one atom of sulfur in said polysulfurated chain is grafted onto said polymer, the remainder of said chain being charge transfer related to said polymer.

3. A composition according to claim 1, wherein all of said poysulfurated chain is charge transfer related to said polymer.

4. A composition according to claim 1 comprising at least 0.7 atom of sulfur per carbon atom of the monomer of said polymer.

5. A composition according to claim 1, wherein said polymer is selected from the group consisting of polyacetylenes, polyparaphenylenes, polythiophenes, polypyrroles, polyanilines and their substituted derivatives.

6. An electrochemical generator comprising a nonaqueous electrolyte, a negative electrode based on lithium and a positive electrode based on a composition comprising a onedimensional electron conducting polymer and at least one polysulfurated chain forming a complex with said polymer, wherein at least a part of said polysulfurated chain is in simple charge transfer relation to said polymer.

7. An electrochemical generator according to claim 6, wherein at least one atom of sulfur in said polysulfurated chain is grafted onto said polymer, the remainder of said chain being charge transfer related to said polymer.

8. An electrochemical generator according to claim 6, wherein all of said polysulfurated chain is charge transfer related to said polymer.

9. An electrochemical generator according to claim 6 wherein said composition comprises at least 0.7 atom of sulfur per carbon atom of the monomer of said polymer.

10. An electrochemcial generator according to claim 6, wherein said polymer is selected from the group consisting of polyacetylenes, polyparaphenylenes, polythiophenes, polypyrroles, polyanilines and their substituted derivatives.

* * * * *